US009539969B2

(12) United States Patent
Crandall et al.

(10) Patent No.: US 9,539,969 B2
(45) Date of Patent: Jan. 10, 2017

(54) SYSTEM AND METHOD FOR MINIMIZING OCCUPANT INJURY DURING VEHICLE CRASH EVENTS

(75) Inventors: Jeff R. Crandall, Charlottesville, VA (US); Costin D. Untaroiu, Charlottesville, VA (US); Eric H. Maslen, Harrisonburg, VA (US); Dipan Bose, Charlottesville, VA (US)

(73) Assignee: ACTIVERESTRAINT, LLC, Charlottesville, VA (US)

( * ) Notice: Subject to any disclaimer, the term of this patent is extended or adjusted under 35 U.S.C. 154(b) by 793 days.

(21) Appl. No.: 12/991,501

(22) PCT Filed: May 6, 2009

(86) PCT No.: PCT/US2009/042988
§ 371 (c)(1),
(2), (4) Date: Jan. 24, 2011

(87) PCT Pub. No.: WO2009/137582
PCT Pub. Date: Nov. 12, 2009

(65) Prior Publication Data
US 2011/0130111 A1 Jun. 2, 2011

Related U.S. Application Data

(60) Provisional application No. 61/050,837, filed on May 6, 2008.

(51) Int. Cl.
*B60R 22/00* (2006.01)
*E05F 15/00* (2015.01)
(Continued)

(52) U.S. Cl.
CPC ......... *B60R 21/0132* (2013.01); *B60R 21/013* (2013.01); *B60R 21/015* (2013.01);
(Continued)

(58) Field of Classification Search
USPC .......................................................... 701/45
See application file for complete search history.

(56) References Cited

U.S. PATENT DOCUMENTS 6,735,506 B2 5/2004 Breed et al.
2002/0169533 A1* 11/2002 Browne ................ B60R 21/013
701/45
(Continued)

FOREIGN PATENT DOCUMENTS

WO 0194970 12/2001
WO 0195141 12/2001

OTHER PUBLICATIONS

European Patent Office, Extended European search report, European Patent Application No. 09743568.9, Mar. 2013.

*Primary Examiner* — Imran Mustafa
(74) *Attorney, Agent, or Firm* — Joshua B. Brady; Williams Mullen

(57) ABSTRACT

A method, computer program product and apparatus for minimizing occupant injury by optimizing occupant restraint properties and/or actions in real time, during pre-crash and crash phases. The restraint system uses three catalogs and a database linking these catalogs. The catalogs include a catalog of possible occupant states, a catalog of possible collision scenarios, and a catalog of potential restraint control laws. The database is an assessment of injury outcome for each possible combination of occupant state, collision scenario, and restraint control law. In addition to the catalogs, the method requires four computational components: an occupant identifier, a collision identifier, a restraint law optimizer, and a restraint controller.

5 Claims, 8 Drawing Sheets

(51) Int. Cl.
    *G05D 1/00*       (2006.01)
    *G05D 3/00*       (2006.01)
    *G06F 7/00*       (2006.01)
    *G06F 17/00*      (2006.01)
    *B60R 21/0132*    (2006.01)
    *B60R 21/015*     (2006.01)
    *B60R 21/013*     (2006.01)
    *B60R 21/0134*    (2006.01)
    *B60R 21/0136*    (2006.01)
    *B60R 21/00*      (2006.01)
    *B60R 21/01*      (2006.01)

(52) U.S. Cl.
    CPC ...... *B60R 21/0134* (2013.01); *B60R 21/0136* (2013.01); *B60R 21/01526* (2014.10); *B60R 2021/0027* (2013.01); *B60R 2021/01259* (2013.01); *B60R 2021/01265* (2013.01)

(56) References Cited

U.S. PATENT DOCUMENTS

| | | |
|---|---|---|
| 2003/0155753 A1 | 8/2003 | Breed |
| 2005/0102080 A1* | 5/2005 | Dell' Eva .......... G06K 9/00362 701/45 |
| 2007/0299587 A1 | 12/2007 | Breed et al. |

* cited by examiner

SYSTEM AND METHOD FOR MINIMIZING OCCUPANT INJURY DURING VEHICLE CRASH EVENTS

RELATED APPLICATIONS

The present invention claims priority from U.S. Provisional Application Ser. No. 61/050,837, filed May 6, 2008, entitled "System and Method for Minimizing Occupant Injury during Passenger Vehicle Crash Events" the disclosure of which is hereby incorporated by reference herein in its entirety, and PCT Patent Application No. PCT/US2009/042988 filed May 6, 2009.

FIELD OF THE INVENTION

The present invention relates to a vehicle occupant restraint or safety system and a method for optimizing a vehicle occupant restraint or safety system to minimize occupant injury during a crash event.

BACKGROUND OF THE INVENTION

Automobiles and other vehicles are increasingly utilizing a variety of automated technologies that involve a wide variety of different vehicle functions and provide vehicle occupants with a diverse range of benefits. Some of those functions are more central to the function of the vehicle, as a vehicle, than other more ancillary functions. For example, certain applications may assist vehicle drivers to "parallel-park" the vehicle. Other automated applications focus on occupant safety. Safety restraint applications are one category of occupant safety applications. Airbag mechanisms or systems are a common example of a safety restraint application in a vehicle. Vehicle applications can include more discretionary functions such as navigation assistance, and environmental controls, and even purely recreational options such as DVD players, Internet access, and satellite radio. Automated devices are an integral and useful part of modern vehicles. Automatic transmission is an example of an automated application geared towards vehicle functionality. However, the automated devices embedded into vehicles need to do a better job of taking into account the context of the particular vehicle, and the person(s) or occupant(s) involved in using the particular vehicle. In particular, such devices typically fail to fully address the interactions between the occupants within the vehicle and the internal environment of the vehicle. It would be desirable for automated applications within vehicles to apply more occupant-centric and context-based "intelligence" to enhance the functionality of automated applications within the vehicle.

Additionally, safety belt restraint system (or sub-system) and air bag systems (or sub-systems) can be designed to meet separate and distinct safety criteria and performance standards based on regulatory and compliance tests and then used together as a combined system to provide occupant protection during frontal vehicle crashes. The performance, in terms of known, measurable occupant injury performance standards such as head injury criteria (HIC) and resultant chest acceleration of these combined systems may be less than the performance of the individual sub-system. Moreover, conventional restraint practices do not provide any or limited adaptation to the crash severity or occupant properties.

Today's restraint systems may even injury the occupant when deployed in an undesirable situation. For example, an air bag deployed when a crash is relatively mild, when an occupant is out of position, or where the occupant is a child, can lead to more serious injuries than if the restraint is not deployed at all. A more intelligent system may decide to deploy the air bags at a slower speed, or not deploy them at all, based on the type of accident and occupant. While the theory of safety restraint design has advanced greatly in the last decade, many of the advancements have remained in the laboratory. Particularly, there has been great progress in computer modeling of restraint systems, which is important since small modifications in the output of various restraint components often lead to significant changes in the safety of the occupants.

An aspect of some of the various embodiments of the present invention overcomes some shortcomings of conventional practices regarding sensing of occupant vehicle and crash.

An aspect of some of the various embodiments of the present invention overcomes some shortcomings of conventional practices by providing, such as but not limited thereto, a real-time process (takes place during the crash) with sensing of the conditions (occupant, vehicle, crash), development of probabilistic estimates of these conditions, and then optimization of the restraint or other safety systems.

Conventional practices are capable of sensing the presence of the occupant and/or belt use but this information is used to trigger a small set of discrete restraint modalities (e.g., air bag deployment or non-deployment, pretensioner deployment or non-deployment). Similarly, the assessment of crash severity triggers a discrete set of restraint modalities. At most, two modalities are used in current restraint systems. With regard to conventional practices, a single mode of operation of the seatbelt and airbags may be too strong for a light crash—thereby causing more injury to the occupant, than had the restraint devices not been activated. Thus, a desirable aspect of some of the various embodiments of the present invention is that it may provide a safety system that can accurately determine the optimal restraint system response to minimize injury to the occupant.

Regarding a collision, occupant properties are evolving in time, and true prediction of these properties in real time is not accurate in conventional practices. Thus, an aspect of an embodiment of the present invention may focus on real-time optimization, probabilistic estimates.

None of the uses of the prior art include calculating actual conditions in real time in a probabilistic manner—leveraging computer-intensive statistical analysis. There is a long-felt need in the art for a restraint system that can optimize a vehicle's restraints for different passengers, and make optimization adjustments in real time. The present invention satisfies this need.

SUMMARY OF THE INVENTION

An aspect of an embodiment provides a method, system and computer program product that provides the ability to use restraint optimization to reduce injury relative to what can be attained with a fixed, non-adaptive strategy. An advantage of an embodiment of the optimized restraint system disclosed herein may, in some scenarios, be more aggressive than the fixed system, or just differently aggressive.

An advantage of an embodiment of the present invention method, system and computer program product is that it provides for optimizing a restraint system (or other safety or event system) that is computationally efficient, operationally efficient, and fast; and that which may be operable with computer processors and passenger vehicle on board computers (for any variety of vehicle types and systems). Computers and processors may be located remote from the vehicle in whole or in part; as well as in communication with computers, processors, or communication devices within the vehicle, other vehicles, or travel infrastructure—including satellites and stationary devices.

An aspect of an embodiment provides a method, system and computer program product that provides the results that may depend on the performance of computational human models, and electronic systems for occupant detection, etc.

An aspect of an embodiment provides a method, computer program product and an apparatus for minimizing occupant injury by optimizing occupant restraint properties and/or actions and other safety measures in real time, during pre-crash and crash phases. The safety or restraint system (and related method and computer program product) may use three catalogs (or any number as desired or required) and a database (or multiple databases as desired or required) linking these catalogs. The catalogs may include a catalog of possible occupant states, a catalog of possible collision scenarios, and a catalog of potential restraint control laws. The database may provide an assessment of injury outcome for each possible combination of occupant state, collision scenario, and restraint control law. In addition to the catalogs, the method may require four computational components: an occupant identifier, a collision identifier, a restraint law optimizer, and a restraint controller, all of which are specific to the vehicle in which the system is installed.

Current automobile restraint systems which employ either a single, fixed restraint response or a very limited (perhaps 2-mode) restraint response are inherently optimized for limited target occupant and collision scenarios. Consequently, the implemented restraint laws may be highly sub-optimal when deployed for a substantially different occupant and/or in a substantially different collision scenario. Further, the use of crash dummies with limited biofidently in assessment of restraint performance may bias the design and performance of these systems toward an occupant model that does not well represent any human occupant.

For an insight into real world collision characteristics refer to FIG. 3—the cumulative frequency of passenger car crashes vs. delta-velocity (Published in Nolan et al., 1998, compilation of NASS CDS data 1990-1995, of which is hereby incorporated by reference herein in its entirety). The dotted curve and small-dashed curve represent AIS2+ and AIS3+ (Abbreviated Injury Scale), respectively. These curves show the crash frequency for different injury levels. The 90th percentile mark corresponds to a delta-velocity range of 45 to 50 km/h. Comparing this with the test protocol speeds, the Insurance Institute for Highway Safety (IIHS) performs the barrier test at 64 km/h which is around 58 km/h delta-velocity for a mid-sized car. The National Highway Traffic Safety Administration (NHTSA) New Car Assessment Program (NCAP) testing velocity corresponds to a similar 50 km/h delta-velocity. The choice of testing velocity shows that most severe injuries are covered by the test protocol; however, injuries in less severe impacts are neglected.

Another parameter affecting the performance of occupant restraints is the occupant characteristics. Two aspects are particularly worthy of notice in crash testing: the guidelines set in the New Car Assessment Program (NCAP) for positioning of the occupant 175 (See FIG. 4) of a vehicle 180, and the use of a passive mechanical surrogate to simulate a human response. One cannot deduce, from this kind of testing, the actual ensemble performance of the restraint system on a reasonable spectrum of collisions and occupants. Consequently, it is not possible to infer the real performance or optimality of the restraint system from such testing.

Today's restraints have the potential to do harm to an occupant. For example, an air bag deployed when a crash is relatively mild, when an occupant is out of position, or where the occupant is a child, can lead to more serious injuries than if the restraint is not deployed at all. While the theory of safety restraint design has advanced greatly in the last decade, many more advancements have been made in the laboratory and are yet to be implemented. Particularly, there has been great progress in computer modeling of restraint systems, which is important since small modifications in the output of various restraint components often lead to significant changes in the safety of the occupants.

An aspect of some of the various embodiments of the present invention may provide methods, computer program products, and apparatuses for, but not limited thereto, controlling a vehicle occupant restraint system that is able to adapt to different types of collisions and occupant conditions in real time, and in a manner that specifically addresses the problem of uncertain knowledge of the collision and occupant. Additionally, an aspect of some of the various embodiments of the present invention has multiple activation modes for the restraint systems and safety devices—not simply on/off parameters. Thus, the restraint system can choose the optimal restraint control law that minimizes the overall injury to that particular occupant in that particular collision scenario—and readjust itself before and during the collision.

To accomplish this, an aspect of some of the various embodiments of the present invention may provide for the collection of data from multiple sensors, including occupant and collision sensors (or other sensors as desired or required). The restraint system and safety devices have stored catalogs of different occupant descriptions and collision scenarios, and a catalog of restraint control laws. Using the sensor data, the restraint system uses a probabilistic approach to assign relative likelihood to each occupant description and collision scenario in the two catalogs. Then, using these relative likelihoods in conjunction with a database that correlates the performance of each element of a restraint law catalog to individual occupant/collision pairs, the expected performance of each restraint law is estimated and that law having the highest expected performance (lowest expected injury) is implemented using the restraint controller.

The database of performance correlation for the catalog of restraint laws may be created offline, prior to the restraint system's use, to leverage computer-intensive collision simulation or experimental results or may be created in real time during the collision. The selection of the optimized restraint law is based on real time data that adjusts to the varying collision conditions. Such database can be constructed, using numerical/computer simulations (e.g., multibody simulations) or actual experimental assessment, for known vehicle, crash, and occupant characteristics. The catalogs and database can be updated either through direct connections or wirelessly.

In one embodiment, the method, computer program product, and restraint system and safety devices determine an optimal restraint law (or safety law) based on a plurality of vehicle collision sensor signals and vehicle occupant sensor signals. The optimal restraint law (or safety law) is the specific combination of restraint and safety device modes, for example air bag deployment and seatbelt resistance, that ensures the lowest occupant injury levels. The occupant injury levels are determined based on an injury metric, discussed in further detail below.

Current occupant safety research addresses acquisition of new information regarding impending collisions as well as the characteristics of the occupant (e.g., pre-crash sensors, air bag suppression sensors, occupant position sensors, occupant tracking systems, range finding radar, vehicle transponders, infra-red systems). An aim of the present invention is to anticipate the continued emergence of these new sources of information related to collision and occupant characterization and to provide a framework for the efficient incorporation of this information into the restraint and safety system decision process. It should be appreciated that any available or future safety related system may be implemented with the embodiments discussed herein.

Current occupant protection research addresses the development of advanced restraint and safety devices including both passive and active systems. An aim of the present invention is to anticipate the continued emergence of these new restraint and safety devices and to provide a framework for the efficient incorporation of these devices into the restraint and safety system decision process. It should be appreciated that any available or future safety related system may be implemented with the embodiments discussed herein.

Current occupant protection research addresses the development of advanced algorithms or restraint laws governing the deployment or adaptation of restraint and safety devices. An aim of the present invention is to anticipate the continued emergence of these algorithms and restraint laws and to provide a framework for the efficient incorporation of these algorithms and restraint laws into the restraint and safety system decision process.

It should be appreciated that an additional feature of an embodiment of the present invention is the estimation of crash and occupant properties and the prediction of occupant injury outcome at the level of body-region and probable severity during and at cessation of the collision event. This provides the opportunity to deliver this information to first responders and other providers of medical care. The various embodiments of present invention disclosed herein makes this information available to any communication system either within or remote to the vehicle.

An aspect of an embodiment provides an event response system that may comprise: one or more sensors (or sensor means or devices); at least one event catalog (or catalog means or device); a catalog of response laws; an event identifier (or identifier means or device); and one or more response controllers (or controller means or devices), wherein the event catalogs are probabilistically evaluated by the event identifier in real time based on readings from corresponding the sensors. The system may further comprise: a database (means or device) assessing the catalog of response laws for the probabilistically evaluated event catalogs, wherein the database may be created prior to or during system use. Further, system may comprise a response law optimizer (optimizer means or device) that uses the database to select an element of the response law catalog based on probabilistic assessments; and wherein the response controller performs the selected element of response law catalog.

An aspect of an embodiment provides a regulatable occupant restraint system comprising: one or more sensors (or sensor means or devices); at least one collision catalog (or catalog means or device); at least one occupant catalog; a catalog of restraint laws; a collision identifier (or identifier means or devices); and an occupant identifier; one or more restraint controllers (or controller means or devices), wherein the collision catalog and the occupant catalog are probabilistically evaluated by the collision identifier and the occupant identifier in real time based on readings from corresponding the sensors. The system may comprise a database (means or device) assessing the catalog of restraint laws for each combination of the probabilistically evaluated occupant catalog and collision catalog, wherein the database is created prior to or during system use, wherein a restraint law optimizer uses the database to select an element of the restraint law catalog based on probabilistic assessments and wherein the restraint controller performs the selected element of the restraint law catalog.

An aspect of an embodiment provides a regulatable occupant safety response system comprising: one or more sensors (or sensor means or devices); at least one collision catalog (or catalog means or device); at least one occupant catalog; a catalog of safety laws; a collision identifier (or identifier means or devices); an occupant identifier; and one or more safety controllers (or controller means or devices), wherein the collision catalog and the occupant catalog are probabilistically evaluated by the collision identifier and the occupant identifier in real time based on readings from corresponding the sensors. The system may further comprise: a database (means or device) assessing the catalog of safety laws for each combination of the probabilistically evaluated occupant catalog and collision catalog, wherein the database is created prior to or during system use, wherein a safety law optimizer uses the database to select an element of the safety law catalog based on probabilistic assessments, and wherein the safety controller performs the selected element of the safety law catalog.

An aspect of an embodiment provides a method of regulating an occupant restraint system to an event, whereby the method may comprise linking (communicating) the occupant restraint system to, for example, the following: one or more sensors; at least one event catalog; at least one occupant catalog; a catalog of restraint laws; an event identifier; one or more restraint controllers; wherein the event catalogs and the occupant catalog are probabilistically evaluated by the event identifier and the occupant identifier in real time based on readings from corresponding the sensor. The system may be linked to a database assessing the catalog of restraint laws for each combination of the probabilistically evaluated occupant catalogs and event catalogs, wherein the database is created prior to or during system use, and wherein a restraint law optimizer uses the database to select an element of the restraint law catalog based on probabilistic assessments. The method may further comprise: sensing the event; and operating the restraint controller to perform the selected element of the restraint law catalog.

An aspect of an embodiment provides a method of monitoring an occupant restraint system, whereby the method may comprise monitoring: one or more sensors; at least one event catalog; at least one occupant catalog; a catalog of restraint laws; an event identifier one or more restraint controllers, wherein the event catalogs and the occupant catalog are probabilistically evaluated by the event identifier and the occupant identifier in real time based on readings from corresponding the sensor. The method may further comprise monitoring: a database assessing the catalog of restraint laws for each combination of the probabilistically evaluated occupant catalogs, wherein the database is created prior to or during system use, and wherein a restraint law optimizer uses the database to select an element of the restraint law catalog based on probabilistic assessments. The method further may further comprise: monitoring changes in parameters of the sensors sensing the event; and adjusting the restraint controllers based on the selected element of the restraint law catalog.

An aspect of an embodiment provides a computer program product for: providing a system or methodology for an event response; regulatable occupant restraint; regulatable occupant safety response; regulating an occupant restraint (or other safety or event response); and/or monitoring an occupant restraint (or other safety or event response). The computer program product comprises a computer useable medium having computer program logic for enabling a processor (or processor means or device) in a computer system to operate the system or perform the methodology discussed herein.

It should be appreciated that the term "means", may include for example, but not limited thereto, the following: components, sub-components, devices, mechanisms, machines, controllers, systems, sub-systems, structures, hardware, software, processing units, processors, computer program products, memory, software, memory, archives, database, random access memory (RAM), and secondary memory. Any of the means cited herein may be in communication (electrically (e.g., wire, wireless, hardware, software) or mechanically) with any other cited means, as well as display devices, graphic devices, controllers or interfaces either on board or remote (or any combination thereof).

These and other features and advantages of the invention will be more fully understood from the following detailed description of the invention taken together with the accompanying drawings.

Various aspects and embodiments of the invention are described in further detail below.

BRIEF DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

DETAILED DESCRIPTION OF EXEMPLARY EMBODIMENTS OF INVENTION

Exemplary Definitions

Figure 1:
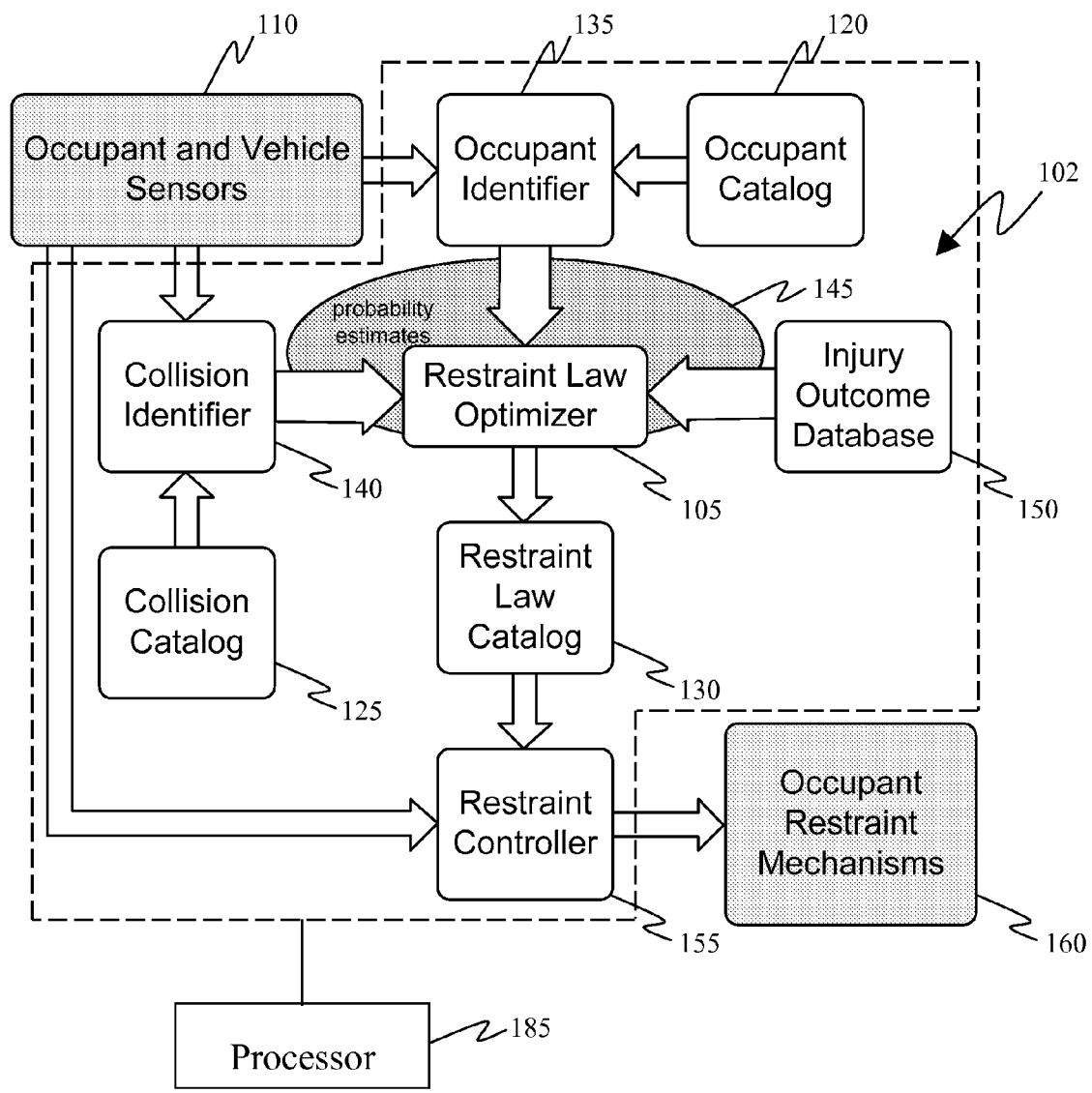
FIG. 1 represents a schematic block diagram of the various modules of the real-time interaction of the occupant identifier, collision identifier, restraint law optimizer, and restraint controller in accordance with an embodiment of the present invention.

In describing and claiming the invention, the following terminology will be used in accordance with the definitions set forth below.

The articles "a" and "an" are used herein to refer to one or to more than one (i.e., to at least one) of the grammatical object of the article. By way of example, "an element" means one element or more than one element.

The term "about," as used herein, means approximately, in the region of, roughly, or around. When the term "about" is used in conjunction with a numerical range, it modifies that range by extending the boundaries above and below the numerical values set forth. For example, in one aspect, the term "about" is used herein to modify a numerical value above and below the stated value by a variance of 20%.

The terms "restraint devices" and "restraint systems" as used herein, refer to active, adaptive, and passive safety components and mechanisms within the occupant compartment that influence the response of the occupant during the pre-crash or crash event. These safety components and mechanisms include but are not limited to seat belts, air bags, bolsters, interior padding, occupant warning systems, active bumpers, multifunctional bumpers, active vehicle infrastructure such as frames, walls, floors, ceilings, compartments, housings, casings, lattice structures, and windows, movable occupant compartment structures such as seats, steering column, and head restraints, active crumple zones or infrastructure, active impact beams (e.g., side impact beams, etc.), post-crash survivability systems such as vehicle fuel system integrity, fire resistance and retardance systems, antilock Braking Systems (ABS), Electronic Stability Control (ESC), Brake Assist, Adaptive Cruise Control, Lane Keeping and Adaptive Steering, In-Vehicle Driver Monitoring, Alcohol Ignition Interlock.

Moreover, "crash" and "collision," is associated with sudden acceleration or deformation of a vehicle in a manner potentially harmful to its occupants. Means of sudden acceleration include but are not limited to striking or being struck by another vehicle or moving object, striking projectiles, striking stationary hardware or objects, or ballistic means including pressure waves or blast. It should be appreciated that any of the safety components, systems, infrastructure, occupants and vehicles may be implemented for military applications to protect against harms way such as ballistics, wave blasts and projectiles. For instance, special or active anti-ballistic, anti-blast or anti-projectile walls, floors, ceilings, beams, bumpers, compartments, housings, lattice structures, and windows may be implemented in response to sensors, attacks, crushing, or changes in acceleration on the vehicle.

It should be appreciated that the systems and actions may applied to pre-crash or pre-collision activities, such as impending and/or detecting ballistics, projectiles, and blasts.

It should be appreciated that any of the safety components, systems, infrastructure, occupants and vehicles may include air, ventilation, HVAC systems or the like for the purpose of addressing any harmful or hazardous environmental conditions. For instance, if any harmful or hazardous gas or air is detected or expected then the system can provide the appropriate safe or healthy breathing and inhalation system for the occupants of the vehicle. This may be accomplished with the proper ventilation systems of the vehicle and/or special sealing systems to seal off the vehicle from any harmful or hazardous exterior environment.

It should be appreciated that any of the military applications may be applied to security, commercial or passenger vehicles as well.

The term "catalog linked to each sensor" (or "sensor linked catalogs"), as used herein, refers to each sensor connected to the sensor's corresponding catalog and one or both components being connected to the processing unit. For example, the collision sensor and collision scenario catalog wherein both may be connected to a vehicle's on board computer. The link (or connection) between sensors, catalogs, databases, controllers and processing units may be accomplished a number of ways such as being hard wired or wirelessly.

The term "catalog of response laws," as used herein, refers to a collection of possible response laws. An example of a catalog of response laws are the catalog of restraint laws described herein.

The terms "crash" and "collision," as used herein refer to a sudden acceleration or deformation of a vehicle in a manner potentially harmful to its occupants. Means of sudden acceleration include but are not limited to striking or being struck by another vehicle or moving object, striking stationary hardware or objects, or ballistic means including pressure waves or blast.

As used herein, a "collision identifier" is a device that reads available collision-related data such as but not limited to vehicle speed, braking status, steering wheel activity, crush zone sensors, accelerometers, and ultrasonic ranging measurements of distance to other vehicles. This data is then used to form an instantaneous probability assessment for each member of the catalog of potential vehicle collision scenarios. The probabilistic assessment of potential collision scenarios is an area of ongoing research. Examples of state-of-the-art methods of probabilistic assessment include statistical classifiers, Bayesian classifiers, and fuzzy classifiers. One source of data to the collision identifier is the collision sensors. The occupant identifier may use the processing unit to make the probability calculation.

The term "collision scenario catalog," as used herein, refers to a collection of possible collision states that the vehicle might experience. Such collision states would be characterized, inter alia, by relative direction, relative velocity, size of the colliding vehicle or object, offset relative to the respective centerlines of the point of impact.

As used herein, "collision sensors" are devices that generate data useful in identifying potential vehicle collisions as well as actual collisions. Collisions sensors may detect relative velocity, acceleration (which includes negative acceleration or deceleration), direction of impact, rollover, and offset of the line of impact from the vehicle center of gravity. Additional characteristics are also possible: the method makes no particular assumptions about the level of detail, type or number of collision sensors.

The term "control laws", as used herein, is synonymous with the term "restraint laws," as defined herein.

The term "database," as used herein, refers to a fixed or real-time adapted collection of performance measures for each possible combination of catalog elements, wherein the combination includes one or more elements from each of the catalogs. The performance measure is a description of how well a given restraint law mitigates injury for a given combination of occupant and collision. The database receives an input of catalog elements and delivers an output of performance measure.

The term "event response system," as used herein, refers generally to a system that generates a certain output(s) based on a specified input(s). One example of an event response system is the passenger restraint system described herein.

The term "fault events," as used herein, refers to any predetermined errors or adverse scenarios which the event response system can detect, through its sensors. One example of a fault event is a rapid change in accelerometer readings, or more specifically, a vehicle collision.

The term "hard wired," as used herein, refers to a connection between components through physical means. This includes components that are integrated which each other or existing concomitantly with each other, such as a catalogs and a database located on the same hard drive.

The term "inertial measurement unit," as used herein, refers to a device that is usually self-contained and generally has three orthogonal accelerometers and three gyroscopes.

Figure 2:
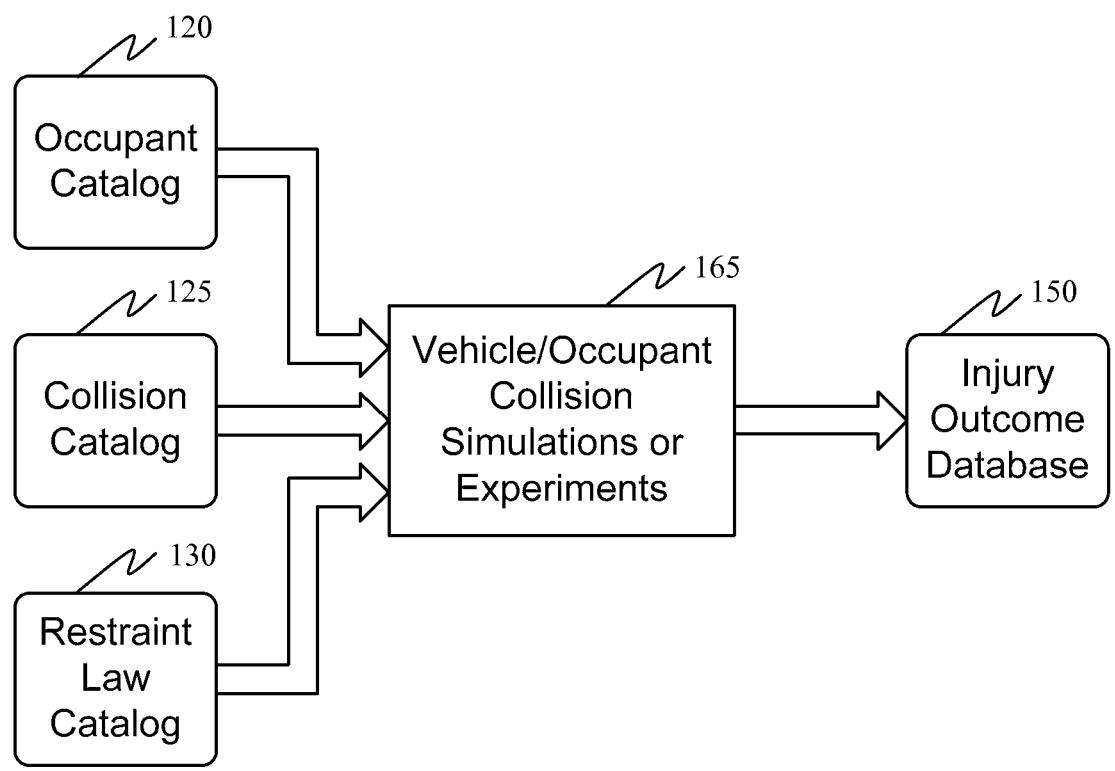
FIG. 2 represents a schematic block diagram of the various modules of the off-line process for constructing the injury outcome database in accordance with an embodiment of the present invention.
Figure 3:
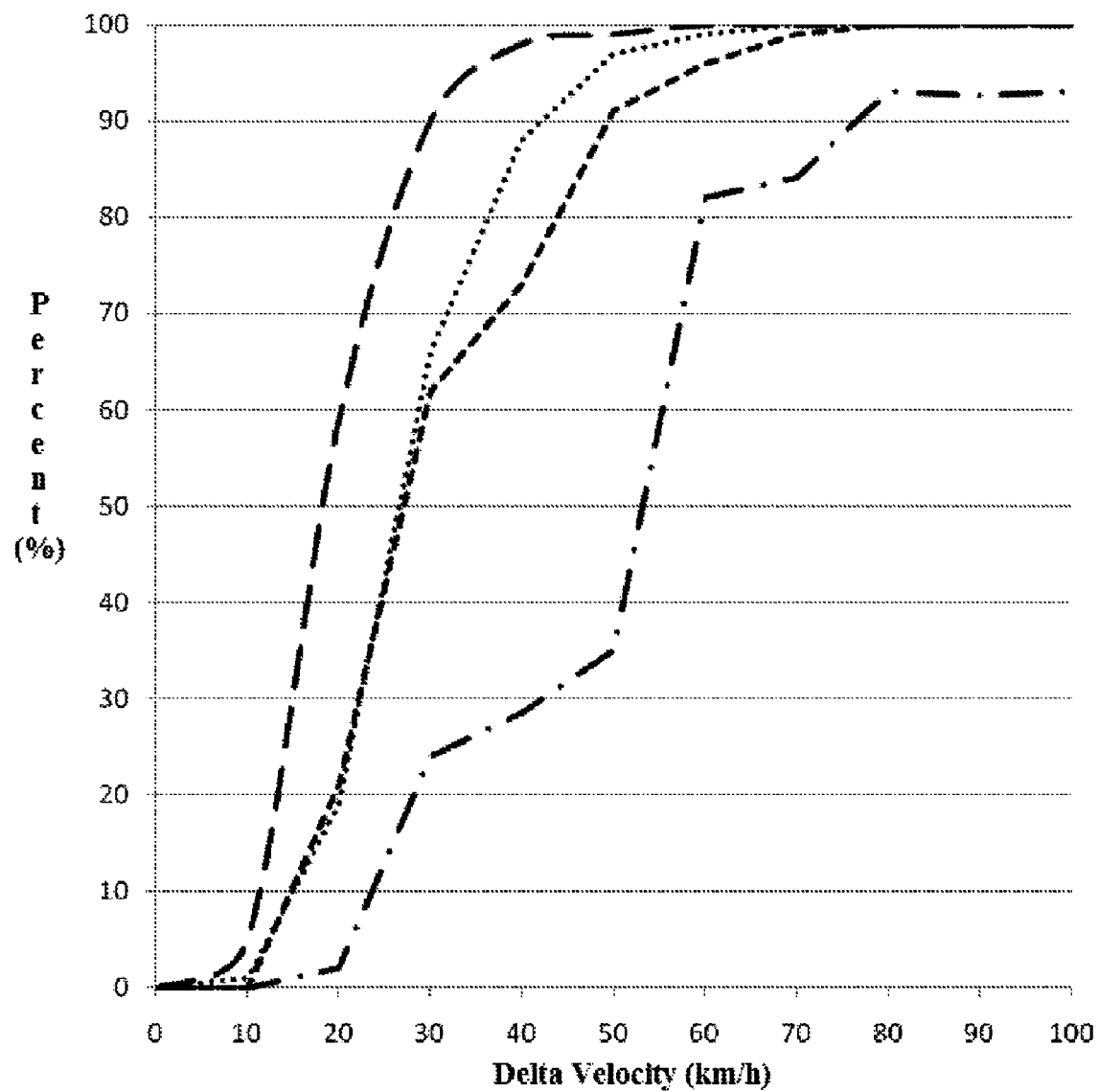
FIG. 3 graphically represents the cumulative frequency of passenger car crashes vs. delta-velocity. The dotted curve represents AIS2+ injuries; the small-dashed curve represents AIS3+ injuries; the large-dashed curve represents all towaways; and the dash-dot curve represents fatal injuries. The x-axis represents the delta velocity measured in kilometers per hour, and the y-axis represents the cumulative percentage of the figure represented by the curve.
Figure 4:
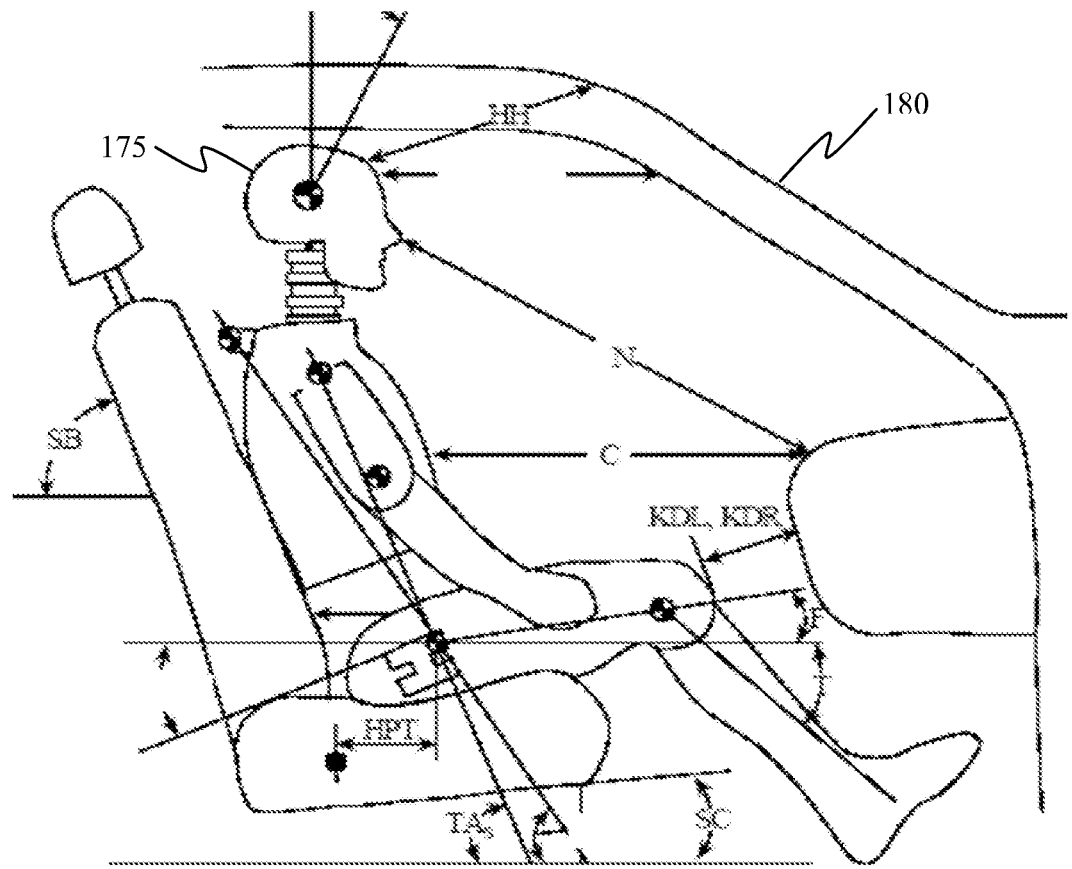
FIG. 4 represents a positioning chart of the occupant based on guidelines set in the New Car Assessment Program (NCAP).

The term "injury outcome database," as used herein, refers to a list of injury outcome metrics associated with each possible combination of members of the occupant catalog, the collision scenario catalog, and the restraint law catalog. The injury outcome metrics may be based on, but are not limited to, head injury criterion (HIC), neck injury criteria (Nij), chest displacement and acceleration, femur and ankle axial loads. For each occupant/collision/control law combination, the database contains an injury outcome metric indicating how severe the occupant injury is expected to be for this particular combination. Typically, the injury outcome metric would be a number indicating the severity of the injuries resulting from the collision: a large number indicates severe injury while a value of zero indicates no (or negligible) injury. This database could be based on simulations, physical testing, or assessment of actual collisions: the method makes no assumption about the manner in which the injury outcome database is constructed. FIG. 2 indicates the off-line process by which the elements of the occupant restraint optimizer may be constructed.

The term "is installed in a passenger vehicle," as used herein, means the restraint system is installed in a passenger vehicle, the restraint system is present in a passenger vehicle, or the restraint system can be added to a passenger vehicle that currently does not have the restraint system.

The term "linked," (or "connected") as used herein, refers to a connection between two elements through hardwired means, wireless means (including radio frequency (RF), microwave, infrared, 802.11 (Wi-Fi), Bluetooth, RFID, or satellite), or a combination of any of these linking mechanisms.

The term "occupant," as used herein, refers to any living-being including human or other animal within a vehicle. In addition, "occupant" may refer to cargo or other goods within a vehicle; as well as systems of the vehicle itself or inanimate objects such as a robot or other controlling or operating systems.

The term "occupant catalog," as used herein, refers to a collection of possible occupant states in the vehicle. The catalog may contain any number of occupant and posture combinations and the method makes no particular assumptions about the level of detail or number of members in the occupant catalog.

As used herein, a "occupant identifier" is a device that reads available passenger-related data such as, but not limited to, seat pan pressure measurements, seat belt payout, seat position, occupant position, and ultrasonic range and measurements of bone mineral content) and uses this data to form an instantaneous probability assessment for each member of the catalog of occupant models. This probability assessment is based both on instantaneous data and on previous data and probability assessments developed from either directly sampled data or from data input by the occupant. Models that are very consistent with the data measured by the occupant identifier will be assigned high probabilities while models that are not consistent with the data will be assigned low probabilities. The specific algorithm by which the occupant identifier produces this probability assessment is not a claim of this patent: only the form of the information generated by the identifier is claimed. One source of information to the occupant identifier is the occupant sensor. The occupant identifier may use the processing unit to make the probability calculation.

As used herein, "occupant sensors" are devices that provide data useful in estimating occupant states in the vehicle. Occupants might be distinguished, for example, by height, gender, body mass index, bone quality, age, seating position and posture among other variables that would describe the occupant state. The posture variably in this context is intended to broadly describe the state of the occupant in the vehicle and could include such occupant attributes as muscle tension, buttocks location, and back inclination relative to the seatback. Occupant sensors may include but are not limited to seat pan sensors, seat belt pay out sensors, optical occupant position sensors, seat position sensors, ultrasonic bone quality measurement sensors, and occupant identity transponders or other electronic devices meant to communicate information about the occupant to the vehicle safety systems.

The term "optimized response laws," as used herein, refers to the combination of response laws, for one or more response controllers, that results in the lowest overall damage. Damage can be measured in many ways, such as monetary value or amount of time needed to be repaired. An example of optimized response laws are the optimized restraint laws described herein.

The term "optimized restraint laws," as used herein, refers to the combination of restraint laws, for one or more restraint mechanisms, that results in the lowest injury outcome metric—causing the least amount of injury for a given occupant in a given crash.

The term database "optimized through computer simulations," as used herein, refers to finding the best responses for each combination of catalog elements, wherein the combination includes one or more elements from each catalog. The best response is a set of rules that dictate the optimal behavior to accomplish a goal, such as a restraint law to accomplish the goal of minimizing occupant injury. The term computer simulations includes computer modeling (such as linear or nonlinear finite element based transient response simulations), and may have the characteristics of being: stochastic or deterministic simulations, steady-state or dynamic, continuous or discrete, and be computed locally or distributed over a network of interconnected computers.

As used herein, a "passenger vehicle" or a "vehicle" is any non-living means of transport by which an occupant may be transported. This includes, but is not limited to, automobiles, boats, trucks, ships, aircraft, spacecraft, motorcycles, Segways™, all-terrain vehicles (four-wheelers and three-wheelers), motorhomes, recreational vehicles, and trains.

As used herein, a "processing unit" is a logic machine that can execute a computer program or make computations, such as a central processing unit (CPU). It can also be a processor built into a vehicle, such as an automobile's engine control unit (ECU). It can also be any part of or all of the components, sub-components, systems, sub-systems, or computer program product of the computer system disclosed in FIG. 5. The processing unit may be separate or integral (or any combination thereof) with any of the components, sub-components, controllers, systems, sub-systems, means, hardware, or computer program products of any embodiments disclosed herein.

The term "probabilistically assessed," as used herein, refers to probability density functions of similarity between models (in catalogs) and sensor readings. Thus, high probabilities will be assigned to models that are consistent with sensor data while low probabilities will be assigned to models that are not consistent with the sensor data.

The term "probabilistically assessed catalog," as used herein, refers to a catalog, such as an occupant catalog, that has identified the likelihood of each catalog element matching a sensor reading from a sensor, such as an occupant sensor.

As used herein, a "response controller" is responsible for actually implementing the response law. The response law may be implemented directly or indirectly through another mechanical component.

The term "response laws," as used herein, refers to a set of rules that dictate the behavior of the response controllers during the fault event. An example of response laws are the restraint laws described herein.

As used herein, a "restraint controller" is responsible for actually implementing the control law selected by the restraint law optimizer. The restraint controller retrieves real-time data from sensors in the vehicle and, based on the specific control law selected by the restraint law optimizer, controls the restraint devices—such as, but not limited to air bags and seatbelts. The only assumption that the method makes about the restraint controller is that it is capable of physically implementing any of the restraint laws contained in the restraint law catalog.

The term "restraint laws" (or "control laws"), as used herein, refers to a set of rules that dictate the behavior of the restraint mechanism(s) during the collision. Restraint mechanisms in the car could include active (or passive, or parameter adjustable) seatbelts, air bags, bolsters, or other devices. These rules may be based on data measured during the collision in addition to pre-specified actions triggered by onset (or anticipation) of a collision. The restraint laws may be passive or active, they may be feedback based or open loop, and they may be either linear or nonlinear: the method makes no particular assumptions about either the form of the laws or about their complexity.

The term "restraint law catalog" (or "catalog of restraint laws"), as used herein, refers to a collection or parametric description of possible restraint laws.

As used herein, a "restraint law optimizer" receives, at each instant in time, probability lists from the occupant and collision identifiers. These probability lists are then used to construct the expected injury metric for each member of the restraint law catalog. The restraint law characterized by the lowest expected injury metric is then deemed best and is activated in the restraint controller. To form the expected injury metric for each restraint law in the catalog, the optimizer simply adds up the product of occupant probability, collision scenario probability, and injury outcome metric for each possible combination of occupant model and collision scenario applied to this restraint law. Once this set of sums of products is formed, the restraint law with lowest expected injury metric is obtained by simply sorting the list. The computational process implied by this selection method is very fast and readily implemented in real-time on practical vehicle computing platforms.

The term "wirelessly" (or "wireless"), as used herein, refers to a connection between components through non-physical means. Wireless connections may be accomplished in a number of ways including: radio frequency (RF), microwave, infrared, 802.11 (Wi-Fi), Bluetooth, RFID, or satellite.

Embodiments

Although the various embodiments of the present invention are mainly described in terms of passenger vehicles, it would be equally applicable to a broad array of control problems. Generally, it is suitable for control problems where the range of possible physical systems (e.g., vehicle, occupant, and posture) is reasonably narrow, the range of possible events requiring special response (ex. collision scenarios) is also reasonably narrow and of a short transient character, and the complexity of the physical system is high enough to make deterministic state estimation impractical. The term "reasonably narrow" simply meaning it could be expressed in a probability density function. An example of such a problem is a fault event controller for industrial machinery. It should be appreciated that the various embodiments are applicable to fields other than occupant restraint. Generally, for example, it may be directed to machine fault detection and selection of "best" palliative action.

It should be appreciated that the various embodiments are applicable to more than just "frontal vehicle crashes." Rather it is applicable to any general "vehicle crashes" such as applying the algorithms, methods and systems at different crash scenarios (e.g., side impacts, rear impacts, rollovers, pedestrian crashes, crushing, etc.).

Referring to FIG. 1, the illustration represents a schematic block diagram of the various modules of the real-time interaction of the occupant identifier, collision identifier, restraint law optimizer, and restraint controller in accordance with an embodiment of the present invention. For instance, this embodiment provides, but is not limited thereto, an active restraint system 102 (or related method and computer program product) that is able to adapt to different types of collision situations and occupants (positions and size) in real time. Thus, the restraint system 102 can choose the optimal restraint control law 105 that minimizes the overall injury to that particular occupant in that particular collision situation—and readjust itself during the collision. To accomplish this, the current invention uses occupant and vehicle collision sensors 110 to monitor the external variables. The restraint system 102 has stored catalogs of different occupant descriptions 120 and catalogs of collision scenarios 125, and a catalog of restraint control laws 130. Using the sensor data, occupant identifier 135 and collision identifier 140 estimate the relative probabilities 145 that each element in the occupant and collision catalogs represents the actual occupant and collision. Then, using a database of injury metric 150 associated with each possible cataloged occupant/collision pair combined with each cataloged restraint law, the expected injury metric for each restraint law is constructed. Finally, the cataloged restraint laws are sorted to find the one with lowest expected injury metric and this law is implemented on the occupant restrain mechanisms 160 using the restraint controller 155. The structure and method of implementation of this system may be generic and may not necessarily be vehicle specific: customization of the system to specific vehicles may be accomplished by choice of data in the catalogs and specific estimation processes implemented in the estimators.

It should be appreciated that the various modules shown in FIG. 1, and disclosed throughout may be a variety applicable elements. Exemplary elements include, but not limited thereto, the following: components, sub-components, devices, mechanisms, machines, controllers, systems, sub-systems, means, structure, hardware, software, processing units, processors, computer program products, memory, software, memory, archives, database, random access memory (RAM), and secondary memory. Any of the modules may be in communication (electrically (wire, wireless, hardware, software) or physically) with any display device, graphic device, controller or interface either on board or remote (or any combination thereof).

It should be appreciated that the various modules shown in FIG. 1, and disclosed throughout may be separate or integral (or any combination thereof) with any of the other modules.

Referring to FIG. 2, FIG. 2 represents a schematic block diagram of the various modules of the off-line process for constructing the injury outcome database in accordance with an embodiment of the present invention. For instance, the database 150 containing the injury metric for each occupant-collision-restraint law combination is created prior to the use of the restraint system—via simulations or experimental assessment 165 of all possible combinations for a given vehicle.

Further, while the process described above implies that the restraint law is continually modified during the collision, another possible embodiment could halt re-optimization at any pre-specified instant during the collision or in response to measured collision variables or states.

As used herein, sensors can be used to detect occupant position and type, collision, steering wheel position, vehicle acceleration/deceleration, rollover (vehicle angle). This list is only representative, not exhaustive. Sensors may have an analog or digital output.

Embodiments of the present invention cover any method of optimization that is based on probability distributions for finite discrete catalogs of occupant/posture and of collision scenario as applied to a finite discrete catalog of potential control laws whose performance on the occupant/posture—collision scenario grid has been determined in advance.

Based on the probability distribution of the catalogs, the best control law is found. One method of determining the best control law is using the expected injury related cost (IRC). IRC is the injury related cost for a given collision occupant combination. The expected IRC is a composite assessment and is different from IRC. The expected IRC (EIRC) for a given control law is a sum over all occupants and all collisions of IRC for each pair and joint probability of each pair, represented by the following formula:

$$E(C_k) = \sum_{i=1}^{x} \sum_{j=1}^{y} f(c_i, v, p_j, C_k) P(c_i) P(p_j)$$

Where $E(C_k)$ is the expected injury related cost (EIRC) and is the expected related cost associated with the kth cataloged restraint law; $c_i$ is the ith cataloged collision scenario; $p_j$ is the jth cataloged occupant description; $P(c_i)$ is the probability that $c_i$ is consistent with the data received by the collision identifier; $P(pj)$ is the probability that pj is consistent with the data received by the occupant identifier; v is the particular vehicle in which the restraint system is implemented; $C_k$ is the kth cataloged restraint law; $f(c_i, v, p_j, C_k)$ is the injury related cost associated with the combination of the ith cataloged collision, the jth cataloged occupant, the kth cataloged restraint law, and the specific vehicle v; x is the total number of collisions scenarios in the collision catalog; and y is the total number of occupant descriptions in the occupant catalog. This formula is computed for each control law, and the control law with the lowest expected IRC is chosen. This formula is only representative, and not exclusive.

One category of occupant parameters consists of the time invariant parameters, herein referred to as the passive occupant model parameters. This mainly consists of the occupant anthropometry properties such as the mass and overall height. In order to analyze these properties in a parametric way, geometric scaling techniques may be used to generate parametric models.

The other category of parameters consists of time varying active parameters. These include parameters that define the posture of the occupant such as seating position, posture angle, upper body velocity, muscle bracing state, etc.

Current technology allows for one time estimation of occupant parameters at the instant a collision is determined and accordingly restraint properties are decided. Whereas, in an embodiment of the present invention, the occupant model could be continuously characterized during the pre-collision phase and use feedback techniques to reduce the variability in estimation. The passive occupant model parameters may be calculated by a joint probability distribution, and the probability density function of the active parameters can then be determined as a conditional probability at the time of crash for a given probability of a passive occupant model using the combined probability model.

Another possibility of an embodiment of the invention is to use the estimated parameters determined through correlation over a time period prior to the event of the collision. At the instant of the collision the parameter information collected over the time period will be used to establish the occupant model probability density at the instant of collision.

In another embodiment of the invention, the database is assembled in advance and presents an assessment of each candidate controller for a range of occupants and collision scenarios that is expected to encompass the actual occupant and actual collision.

Figure 6:
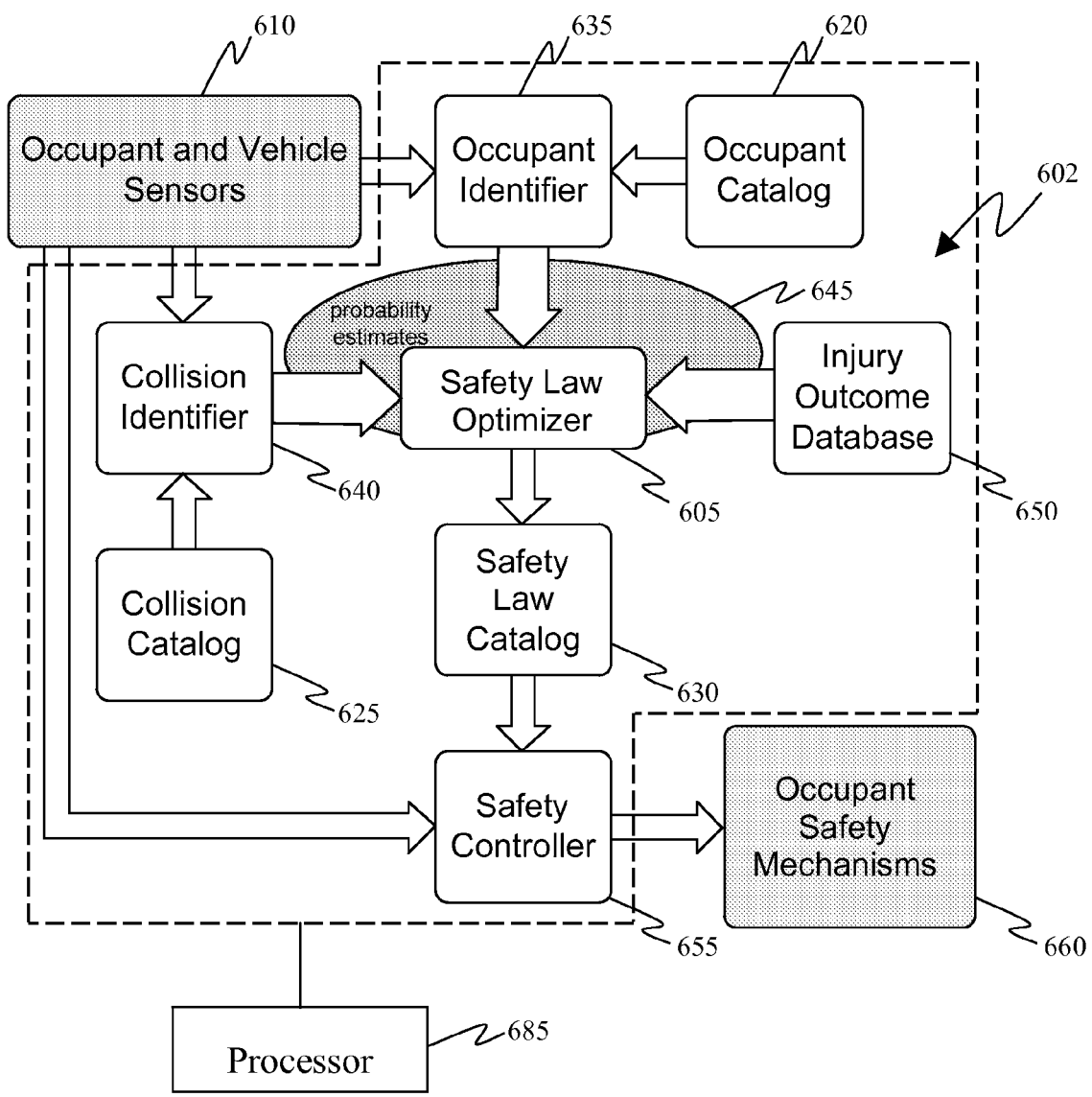
FIG. 6 represents a schematic block diagram of the various modules of the real-time interaction of the occupant identifier, collision identifier, safety law optimizer, and safety controller in accordance with an embodiment of the present invention.

Referring to FIG. 6, the illustration represents a schematic block diagram of the various modules of the real-time interaction of the occupant identifier, collision identifier, safety law optimizer, and safety controller in accordance with an embodiment of the present invention. For instance, this embodiment provides, but is not limited thereto, an active safety system 602 (or related method and computer program product) that is able to adapt to different types of collision situations and occupants (positions and size) in real time. Thus, the safety system 602 can choose the optimal safety control law 605 that minimizes the overall injury to that particular occupant in that particular collision situation—and readjust itself during the collision. To accomplish this, the current invention uses occupant and vehicle collision sensors 610 to monitor the external variables. The safety system 602 has stored catalogs of different occupant descriptions 620 and catalogs of collision scenarios 625, and a catalog of safety control laws 630. Using the sensor data, occupant identifier 635 and collision identifier 640 estimate the relative probabilities 645 that each element in the occupant and collision catalogs represents the actual occupant and collision. Then, using a database of injury metric 650 associated with each possible cataloged occupant/collision pair combined with each cataloged safety law, the expected injury metric for each safety law is constructed. Finally, the cataloged safety laws are sorted to find the one with lowest expected injury metric and this law is implemented on the occupant safety mechanisms 660 using the safety controller 655. The structure and method of implementation of this system may be generic and may not necessarily be vehicle specific: customization of the system to specific vehicles may be accomplished by choice of data in the catalogs and specific estimation processes implemented in the estimators.

Figure 7:
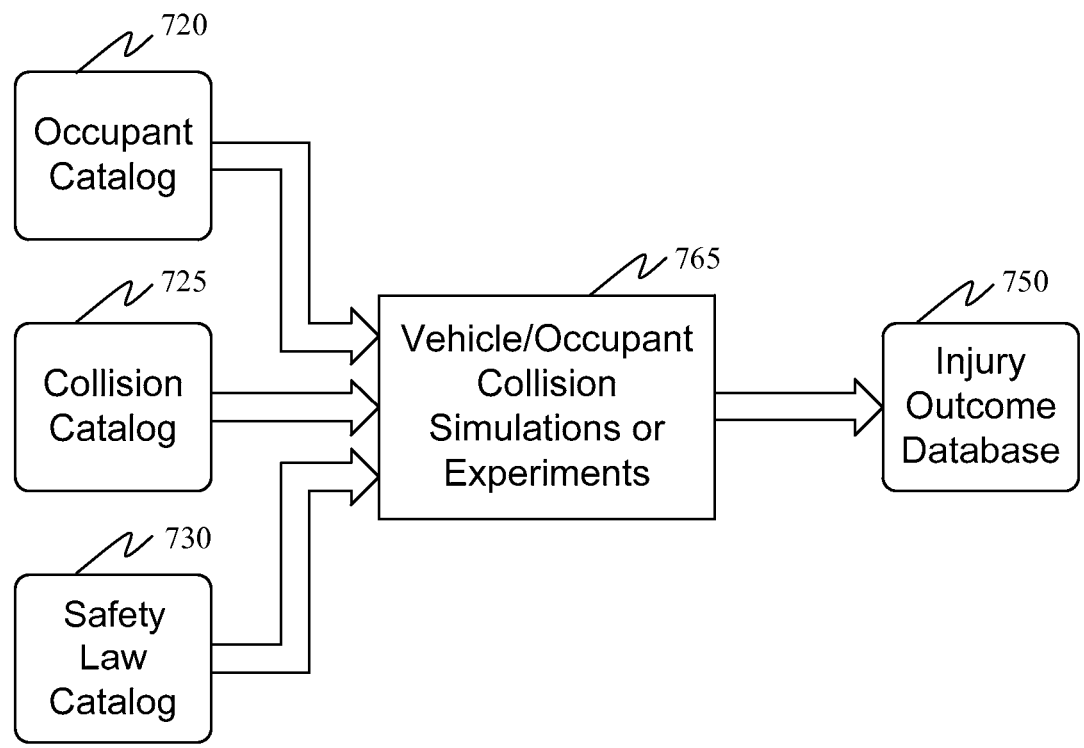
FIG. 7 represents a schematic block diagram of the various modules of the off-line process for constructing the injury outcome database in accordance with an embodiment of the present invention.

Referring to FIG. 7, FIG. 7 represents a schematic block diagram of the various modules of the off-line process for constructing the injury outcome database in accordance with an embodiment of the present invention. For instance, the database 650 containing the injury metric for each occupant-collision-safety law combination is created prior to the use of the safety system—via simulations or experimental assessment 665 of all possible combinations for a given vehicle.

Figure 8:
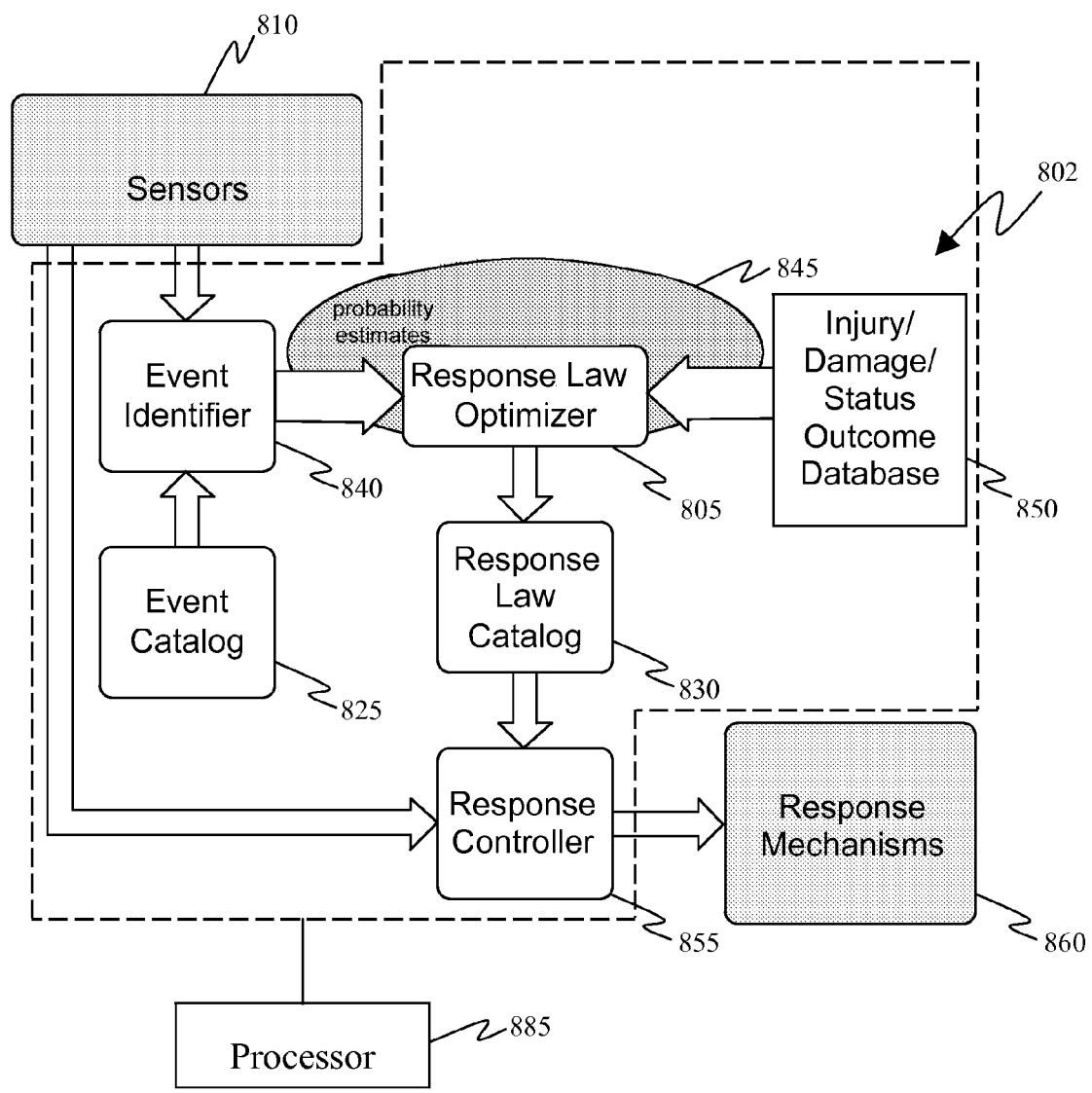
FIG. 8 represents a schematic block diagram of the various modules of the real-time interaction of the, event identifier, response law optimizer, and response controller in accordance with an embodiment of the present invention.

Referring to FIG. 8, the illustration represents a schematic block diagram of the various modules of the event response system 802 that may comprise one or more sensors 810; at least one event catalog 825; a catalog of response laws 830; an event identifier 840; and one or more response controllers 855. The event catalogs 825 are probabilistically evaluated by the event identifier 840 in real time based on readings from corresponding the sensors 810. The system may further comprise a database 850 (such as an injury, damage or status outcome database) assessing the catalog of response laws 830 for the probabilistically evaluated event catalogs 825, wherein the database 850 may be created prior to or during system use. Further, a response law optimizer 805 uses the database 850 to select an element of the response law catalog 830 based on probabilistic assessments and the response controller 855 may then performs the selected element of response law catalog 830. The sensors 810, the event catalogs 825, the catalog of response laws 830, the database 850, and the response controllers 855 may be linked to each other either wirelessly or hard wired, or any combination thereof. The desired or required performance is implemented on a response mechanism 860. The event response system 802 may be directed to a variety of systems, such as a fault event controller for addressing a problem with an industrial or commercial machinery or system, for example. Any injury, damage, imperfection, or application and system status may be addressed with the embodiments disclosed herein. Thus, it should be appreciated that various embodiments may be applicable to fields other than occupant restraint and safety. Generally, for example, it may be directed to machine fault detection and selection of "best" palliative action.

Figure 5:
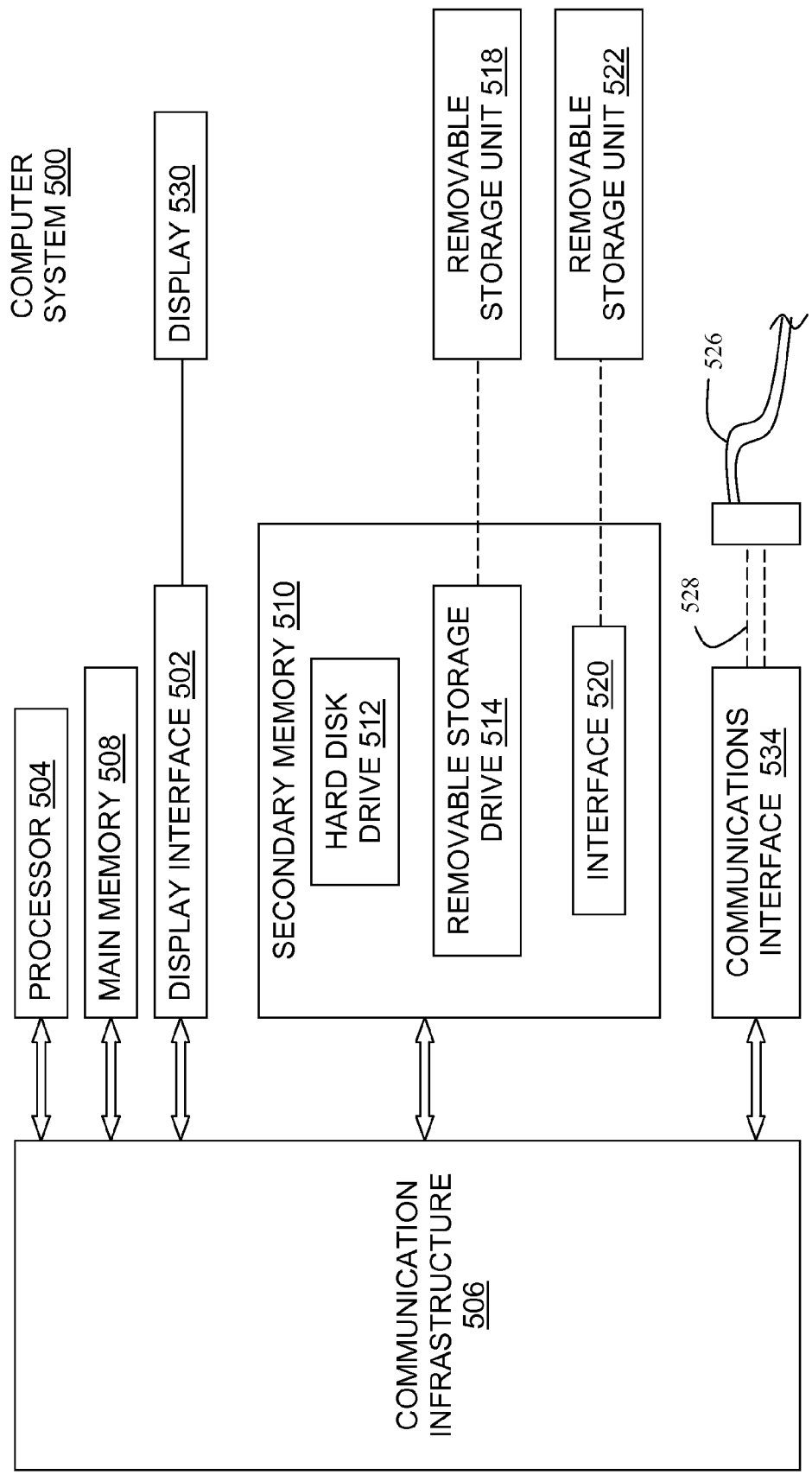
FIG. 5 is a schematic block diagram for a system or related method of an embodiment of the present invention in whole or in part.

Turning to FIG. 5, FIG. 5 is a functional block diagram for a computer system 500 for implementation of an exemplary embodiment or portion of an embodiment of present invention. For example, a method or system of an embodiment of the present invention may be implemented using hardware, software or a combination thereof and may be implemented in one or more computer systems or other processing systems, such as personal digital assistants (PDAs) equipped with adequate memory and processing capabilities. In an example embodiment, the invention was implemented in software running on a general purpose computer 50 as illustrated in FIG. 5. The computer system 500 may includes one or more processors, such as processor 504. The Processor 504 is connected to a communication infrastructure 506 (e.g., a communications bus, cross-over bar, or network). The computer system 500 may include a display interface 502 that forwards graphics, text, and/or other data from the communication infrastructure 506 (or from a frame buffer not shown) for display on the display unit 530. Display unit 530 may be digital and/or analog.

The computer system 500 may also include a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, a flash memory, etc. The removable storage drive 514 reads from and/or writes to a removable storage unit 518 in a well known manner. Removable storage unit 518, represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other means for allowing computer programs or other instructions to be loaded into computer system 500. Such means may include, for example, a removable storage unit 522 and an interface 520. Examples of such removable storage units/interfaces include a program cartridge and cartridge interface (such as that found in video game devices), a removable memory chip (such as a ROM, PROM, EPROM or EEPROM) and associated socket, and other removable storage units 522 and interfaces 520 which allow software and data to be transferred from the removable storage unit 522 to computer system 500.

The computer system 500 (or any modules disclosed herein) may also include a communications interface 524. Communications interface 124 allows software and data to be transferred between computer system 500 (or any modules disclosed herein) and external devices. Examples of communications interface 524 may include a modem, a network interface (such as an Ethernet card), a communications port (e.g., serial or parallel, etc.), a PCMCIA slot and card, a modem, etc. Software and data transferred via communications interface 524 are in the form of signals 528 which may be electronic, electromagnetic, optical or other signals capable of being received by communications interface 524. Signals 528 are provided to communications interface 524 via a communications path (i.e., channel) 526. Channel 526 (or any other communication means or channel disclosed herein) carries signals 528 and may be implemented using wire or cable, fiber optics, blue tooth, a phone line, a cellular phone link, an RF link, an infrared link, wireless link or connection and other communications channels.

In this document, the terms "computer program medium" and "computer usable medium" are used to generally refer to media or medium such as various software, firmware, disks, drives, removable storage drive 514, a hard disk installed in hard disk drive 512, and signals 528. These computer program products ("computer program medium" and "computer usable medium") are means for providing software to computer system 500. The computer program product may comprise a computer useable medium having computer program logic thereon. The invention includes such computer program products. The "computer program product" and "computer useable medium" may be any computer readable medium having computer logic thereon.

Computer programs (also called computer control logic or computer program logic) are may be stored in main memory 508 and/or secondary memory 510. Computer programs may also be received via communications interface 524. Such computer programs, when executed, enable computer system 500 to perform the features of the present invention as discussed herein. In particular, the computer programs, when executed, enable processor 504 to perform the functions of the present invention. Accordingly, such computer programs represent controllers of computer system 500.

In an embodiment where the invention is implemented using software, the software may be stored in a computer program product and loaded into computer system 500 using removable storage drive 514, hard drive 512 or communications interface 524. The control logic (software or computer program logic), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine to perform the functions described herein will be apparent to persons skilled in the relevant art(s).

In yet another embodiment, the invention is implemented using a combination of both hardware and software.

In an example software embodiment of the invention, the methods described above may be implemented in SPSS control language or C++ programming language, but could be implemented in other various programs, computer simulation and computer-aided design, computer simulation environment, MATLAB, or any other software platform or program, windows interface or operating system (or other operating system) or other programs known or available to those skilled in the art.

In another embodiment of the invention, the occupant sensor may be an apparatus for determining the presence, weight, and seated location of an occupant in a vehicle seat, similar to, but not necessarily same as, U.S. Pat. No. 7,249,649 (of which is hereby incorporated by reference herein). Alternatively, an embodiment of the present invention may include sensors with rotary potentiometers, resolvers, or encoders to transfer movement to a processor which controls air bag deployment.

In another embodiment of the invention, the occupant sensor may be similar to, but not necessarily the same as, U.S. Pat. No. 7,106,206 (of which is hereby incorporated by reference herein), wherein a capacitive occupant sensor for a seat, where the sensor dielectric is in the form of a fluid-filled elastomeric bladder, and the sensor includes a primary region that is subjected to occupant-related seat forces and a secondary region that is isolated or shielded from occupant-related seat forces.

In another embodiment of the invention, the occupant sensor may be similar, but not necessarily the same as, to U.S. Pat. No. 7,098,674 (of which is hereby incorporated by reference herein), wherein the apparatus detects the presence, position, and/or other characteristics of an occupant by sensing the influence of an occupant upon an electric field generated proximate to a seat.

In another embodiment of the invention, the collision sensor could be an accelerometers mounted in the passenger compartment that detect and measure vehicle accelerations during the crash. The accelerometer produces an analog signal proportional to the acceleration experienced by the accelerometer and hence the vehicle on which it is mounted. An analog to digital converter (ADC) transforms this analog signal into a digital time series. This sensor and all other sensors may be located at positions in and around the vehicle, based on the sensor and vehicle type.

In another embodiment of the invention, the collision sensor may be similar to, but not necessarily the same as, U.S. Pat. No. 5,485,041 (of which is hereby incorporated by reference herein), comprising an acceleration sensor that includes a permanent magnet mounted for movement within a cylindrical cavity in a body of non-magnetic material.

In another embodiment of the invention, the collision sensors are sensors that may comprise one or more micro-machined or piezo-electric accelerometers, one or more gyroscopes, associated electronic circuitry, and/or one or more electromechanical sensors (see U.S. Pat. No. 7,284,769 (of which is hereby incorporated by reference herein)).

In another embodiment of the invention, the collision sensors may be similar to, but not necessarily the same as, U.S. Pat. No. 6,085,151 (of which is hereby incorporated by reference herein), a predictive collision sensing system.

In another embodiment of the invention, the acceleration/deceleration sensor could be any type of accelerometer.

In another embodiment of the invention, the rollover sensor may be similar to, but not necessarily, U.S. Pat. No. 7,333,884 (of which is hereby incorporated by reference herein), comprising at least one sensor for the detection of the angle of rotation of the vehicle and/or at least one angular rate sensor. The control device distinguishes between at least one stage of a lower degree of severity and at least one stage of a higher degree of severity of the rollover scenario in the detection of a respective rollover scenario with reference to the sensor data in order to activate at least one reversible safety device in the case of a lower degree of severity and to activate at least one irreversible safety device in the case of a higher degree of severity.

In another embodiment of the invention, the steering wheel position sensor may be similar to, but not necessarily, U.S. Pat. No. 7,236,907 (of which is hereby incorporated by reference herein), such as a steering angle sensing system including at least one steering angle sensing device for outputting an analog or digital signal representative of a steering angle position of a steering wheel.

In each embodiment, all the sensors may include filtering for the signal produced by the sensors—such as a low-pass filter. Further, that filter may be tested and if a deviation is detected, it may be corrected by software or parameterization of the triggering algorithm (see U.S. Pat. No. 7,305,863, of which is hereby incorporated by reference herein).

The disclosures of each and every patent, patent application, and publication cited herein are hereby incorporated by reference herein in their entirety.

Headings are included herein for reference and to aid in locating certain sections. These headings are not intended to limit the scope of the concepts described therein under, and these concepts may have applicability in other sections throughout the entire specification.

While this invention has been disclosed with reference to specific embodiments, it is apparent that other embodiments and variations of this invention may be devised by others skilled in the art without departing from the true spirit and scope of the invention.

It is therefore intended that the foregoing detailed description be regarded as illustrative rather than limiting, and that it be understood that it is the following claims, including all equivalents, which are intended to define the scope of this invention.

The following patents, applications and publications as listed below and throughout this document are hereby incorporated by reference in their entirety herein.

The devices, systems, compositions, computer programs, and methods of various embodiments of the invention disclosed herein may utilize aspects disclosed in the following references, applications, publications and patents and which are hereby incorporated by reference herein in their entirety:

1. U.S. Pat. No. 6,757,602 B3, Jun. 29, 2003 to D. Breed, et. al., "System for Determining the Occupancy State of a Seat in a Vehicle and Controlling a Component Based Thereon".
2. U.S. Pat. No. 6,850,824 B2, Feb. 1, 2005 to D. Breed, "Method and Apparatus for Controlling a Vehicular Component".
3. U.S. Pat. No. 6,944,544 B1, Sep. 13, 2005 to K. Prakah-Asante, et. al., "Adaptive Vehicle Safety System for Collision Compatibility".
4. U.S. Pat. No. 7,085,637 B2, Aug. 1, 2006 to D. Breed, et. al., "Method and System for Controlling a Vehicle".
5. U.S. Pat. No. 7,103,460 B1, Sep. 5, 2006 to D. Breed, "System and Method for Vehicle Diagnostics".
6. U.S. Pat. No. 7,147,246 B2, Dec. 12, 2006 to D. Breed, "Method for Airbag Inflation Control".
7. U.S. Patent Application Publication No. US 2005/0114108 A1, May 26, 2005 to J. Cooper, et. al., "Safety Restraint Design System and Methodology".
8. U.S. Patent Application Publication No. US 2007/0075919 A1, Apr. 5, 2007 to D. Breed, "Vehicle with Crash Sensor Coupled to Data Bus".
9. U.S. Pat. No. 6,836,754 B2, Dec. 28, 2004 to J. Cooper, "Biomechanical System Development of a Restraint System".
10. U.S. Pat. No. 6,889,215 B2, May 3, 2005 to O. Basir, et al., "Intelligent Air Bag System".
11. U.S. Pat. No. 6,520,535 B1, Feb. 18, 2003 to Stanley, et al., "Occupant Detection System".
12. U.S. Pat. No. 7,249,649 B2, Jul. 31, 2007 to F. Speckhart, et al., "Occupant Sensor for a Vehicle Restraint System".
13. U.S. Pat. No. 7,106,206 B2, Sep. 12, 2006 to P. Sprecher, et al., "Capacitive Occupant Sensor for a Vehicle Seat".
14. U.S. Pat. No. 7,098,674 B2, Aug. 29, 2006 to J. Stanley, et al., "Occupant Sensor".
15. U.S. Pat. No. 5,485,041 B2, Jan. 16, 1996 to J. Meister, "Impact Sensor for Vehicle Safety Restraint System".
16. U.S. Pat. No. 7,284,769 B2, Oct. 23, 2007 to D. Breed, "Method and Apparatus for Sensing a Vehicle Crash".
17. U.S. Pat. No. 7,333,884 B2, Feb. 19, 2008 to A. Darvish, "Rollover Detection System".
18. U.S. Pat. No. 7,236,907 B2, Jun. 26, 2007 to R. Kaster, et al., "Steering Angle Sensor Assembly with Pulse Width Modulated Output Signal".

19. U.S. Pat. No. 7,305,863 B2, Dec. 11, 2007 to R. Recknagel, et al., "Impact Sensor and Method for Testing the Same".
20. U.S. Pat. No. 6,085,151, Jul. 4, 2000 to M. Farmer, et al., "Predictive Collision Sensing System".

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. An occupant restraint method of regulating an occupant restraint system in a vehicle to an event, the method comprising:
   linking the occupant restraint system to:
      at least one sensor;
      an event catalog comprising a predetermined and finite plurality of discrete possible events involving the vehicle,
      an occupant catalog comprising a predetermined and finite plurality of discrete possible occupant states in the vehicle;
      a catalog of predetermined restraint laws comprising a set of rules that dictate the behavior of at least one restraint mechanism during an event;
      an event identifier; and
      at least one restraint controller controlling the at least one restraint mechanism;
   receiving a sensor data from the at least one sensor;
   evaluating in real-time the probability that each possible event in the event catalog and each possible occupant state in the occupant catalog is consistent with the sensor data;
   assessing, using a database, each predetermined set of rules for each combination of each probabilistically assessed possible event in the event catalog and each probabilistically assessed possible occupant state in the occupant catalog, wherein the database is at least one of created one of prior to system use and during system use, but prior to an event;
   selecting an element of the restraint law catalog based on the probabilistic assessment, wherein a restraint law optimizer uses the database to select the element of the restraint law catalog;
   sensing the event with the at least one sensor; and
   operating the at least one restraint controller to perform the selected element of the restraint law catalog.

2. The method of claim 1, wherein the at least one sensor, the occupant catalogs, the event catalog, the catalog of restraint laws, the database, and the at least one restraint controller are connected by one of wireless connection and hard wired connection.

3. The method of regulating an occupant restraint system of claim 1, wherein the event is a collision.

4. The method of regulating an occupant restraint system of claim 1, wherein the event is a change in acceleration.

5. The method of regulating an occupant restraint system of claim 1, wherein the event is a change in occupant position.

\* \* \* \* \*